No. 779,896. PATENTED JAN. 10, 1905.
J. WOOD, Jr.
FLANGED PIPE.
APPLICATION FILED AUG. 8, 1904.
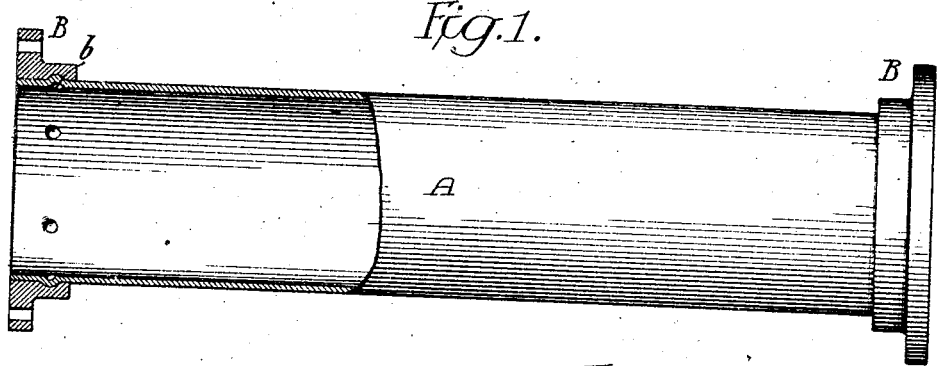
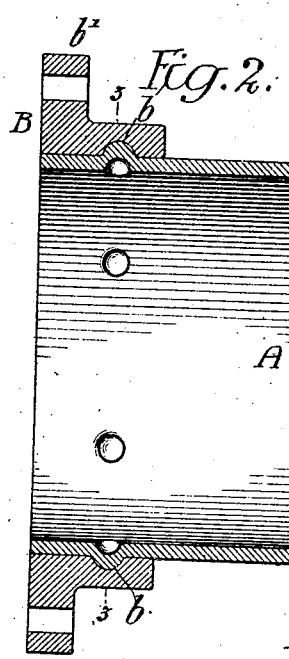
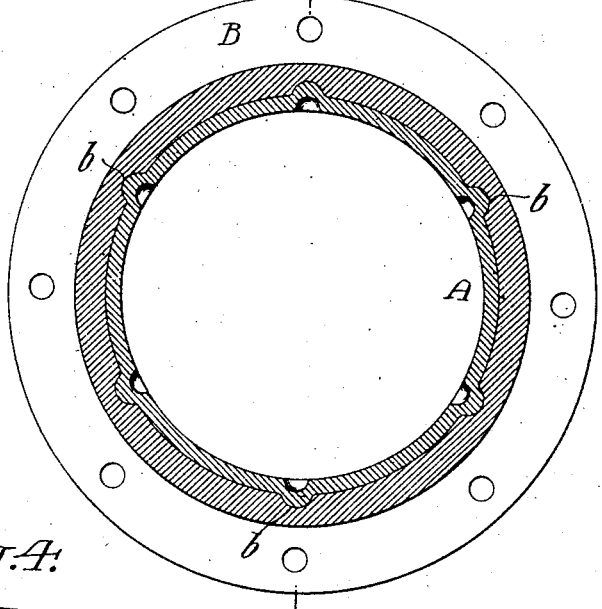
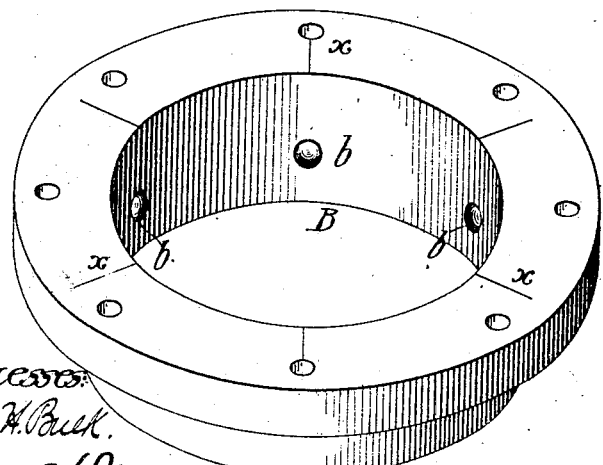
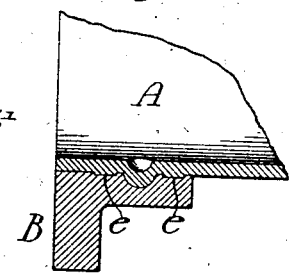
Inventor
John Wood Jr.
by his Attorneys, No. 779,896.

Patented January 10, 1905.

UNITED STATES PATENT OFFICE.

JOHN WOOD, JR., OF CONSHOHOCKEN, PENNSYLVANIA.

FLANGED PIPE.

SPECIFICATION forming part of Letters Patent No. 779,896, dated January 10, 1905.

Application filed August 8, 1904. Serial No. 220,049.

*To all whom it may concern:*

Be it known that I, JOHN WOOD, Jr., a citizen of the United States, residing at Conshohocken, Pennsylvania, have invented certain Improvements in Flanged Pipes, of which the following is a specification.

My invention relates to certain improvements in wrought-iron or steel rolled pipes which are provided with separate flanges made of iron, steel, or other suitable metal.

The object of my invention is to place the flanges upon these pipes accurately and by a comparatively cheap method, making a tight joint between the flange and the pipe which will resist any strains to which the pipe is subjected.

In the accompanying drawings, Figure 1 is a side view, partly in section, illustrating my invention. Fig. 2 is an enlarged sectional view of part of the pipe on the line 2 2, Fig. 3. Fig. 3 is a sectional view on the line 3 3, Fig. 2. Fig. 4 is a perspective view of one of the flanges detached, and Fig. 5 is a view of a modification.

A in the present instance is a section of rolled pipe which may be of any diameter desired, and the metal may be of any thickness, depending entirely upon the character of work to which the pipe is to be subjected.

B B are flanges which are secured to each end of the pipe-section A. The several sections are secured together through the medium of these flanges in the ordinary manner. Heretofore it has been found necessary to either expand the pipes into the flanges so as to make a tight joint or thread the pipe and screw the flanges on the threaded portions thereof. Both these methods are objectionable and costly.

In applying the flange to the pipe I bore the opening in the flange slightly less in diameter than the outer diameter of the pipe and form in the flange one or more recesses $b$ of any shape desired, the recess being circumscribed, and the number of the recesses will depend upon the diameter of the pipe. The recesses can be formed during the process of casting the flange or may be formed by drilling after the flange is finished. By the term "circumscribed recess" I mean a recess whose walls sufficiently inclose the recess to prevent longitudinal as well as rotative movement of the flange in respect to the body of the pipe. The flange B is heated, so that it will expand sufficiently to be slipped over the end of the pipe, and as the flange cools it will shrink upon the pipe, forming a tight joint. This joint may in some instances, if desired, be calked in such a manner as to upset the metal of the pipe against the metal of the flange to take up any irregularities or roughness that may be on the outside surface of the pipe where it comes in contact with the flange. The portion $b'$ of the flange is scored, as shown at $x$ in Fig. 4, in line with each recess, and these recesses are preferably in line with each other a certain distance from the end of the flange, so that after the flange is shrunk onto the pipe the operator forces the metal of the pipe into the recesses, as clearly shown in Figs. 2 and 3, firmly locking the flange to the pipe and preventing any longitudinal or rotary motion of one independent of the other. The pressing of the metal of the pipe into these cavities may be done by hammering or by using a press or other suitable machine for this purpose. It will be understood that the recesses may be of any size or shape without departing from my invention. I preferably make them, however, semispherical, as shown, and of such a size that the metal of the pipe can be forced into the openings without deteriorating or crystallizing the metal of the pipe at the flange. Thus it will be seen that I fasten the flange to the pipe by shrinkage and by a series of locks forced from the pipe into cavities in the flange.

I may form one or more shallow annular grooves in the inner surface of the flange, so that when the flange is shrunk upon the pipe the shrinkage will force the metal of the pipe into these grooves. These grooves are clearly shown at $e\ e$, Fig. 5.

I claim as my invention—

1. The combination of a pipe, a flange mounted on the pipe and having a recess in its inner side circumscribed in all directions of the surface and into which the metal of the pipe is forced, so as to hold the pipe against longitudinal or rotative movement independent of the flange, substantially as described.

2. The combination of a pipe, a flange shrunk thereon, said flange having a series of recesses, and projections on the pipe entering the recesses, substantially as described.

3. The combination of a pipe, a flange shrunk on the end of the pipe, a series of recesses in the flange and projections on the pipe entering the said recesses, the joint between the pipe and the flange being calked, substantially as described.

In testimony whereof I have signed my name to this specification in the presence of two subscribing witnesses.

JOHN WOOD, Jr.

Witnesses:
   WILL. A. BARR,
   JOS. H. KLEIN.